US 7,880,815 B2

(12) United States Patent
Yeh et al.

(10) Patent No.: US 7,880,815 B2
(45) Date of Patent: Feb. 1, 2011

(54) METHOD FOR DETECTING AND ELIMINATING FLASH SCENE IN DIGITAL VIDEO

(75) Inventors: Chia-Hung Yeh, Taoyuan (TW);
Hsuan-Huei Shih, Taoyuan (TW);
Chung-Chieh Kuo, Taoyuan (TW)

(73) Assignee: Mavs Lab, Inc., Taoyuan (TW)

( * ) Notice: Subject to any disclaimer, the term of this patent is extended or adjusted under 35 U.S.C. 154(b) by 1789 days.

(21) Appl. No.: 11/030,943

(22) Filed: Jan. 10, 2005

(65) Prior Publication Data

US 2006/0152634 A1  Jul. 13, 2006

(51) Int. Cl.
*H04N 5/14* (2006.01)
*H04N 9/64* (2006.01)

(52) U.S. Cl. ...................... 348/700; 348/701

(58) Field of Classification Search .......... 348/700, 348/701
See application file for complete search history.

(56) References Cited

U.S. PATENT DOCUMENTS 5,418,895 A * 5/1995 Lee ........................... 345/604
5,719,643 A * 2/1998 Nakajima ................... 348/700
5,990,980 A * 11/1999 Golin ......................... 348/700
6,870,956 B2 * 3/2005 Qi et al. ..................... 382/170
7,110,454 B1 * 9/2006 Chakraborty ........... 375/240.16
2003/0123726 A1   7/2003 Suh ........................... 382/170
2004/0008284 A1   1/2004 Kim .......................... 348/699

* cited by examiner

*Primary Examiner*—Marsha D Banks Harold
*Assistant Examiner*—Chikaodili E Anyikire
(74) *Attorney, Agent, or Firm*—McGinn IP law Group, PLLC

(57) ABSTRACT

Method disclosed in the present invention is proposed to detect and eliminate flash scene in digital video. Particularly, averaging shot distribution of digital video is employed as knowledge to develop the algorithm of the present invention, and which is incorporated and used to identify three general types of shot distribution for flash scene event. In the present invention, the luminance difference between two consecutive frames is instead of actually analyzing the visual content so as to reduce the computational complexity. As a result, positions of flash frames can be exactly detected from the video signal for many applications. The method comprises the steps: frames are extracted from a video sequence inputted. A luminance difference by two adjoining frames is calculated. Then a histogram is made to record the differences, and a threshold is determined accordingly. Then the flash scene is detected and categorized into three types, and finally being eliminated.

21 Claims, 12 Drawing Sheets

METHOD FOR DETECTING AND ELIMINATING FLASH SCENE IN DIGITAL VIDEO

BACKGROUND OF THE INVENTION

1. Field of the Invention

The present invention discloses a method for detecting and eliminating the flash scene in digital video with respect to the video content analysis and TV program management. One of the important issues is to obtain the accurate shot information and discover the flash scene herein.

2. Description of Related Art

Flash scenes usually appear in many kinds of digital video such as fashion shows, concert, sport TV broadcasting, etc. Usually, the camera's flash lamp or other optical instruments cause those scenes due to the photographer tries to enhance the quality of the pictures. Moreover, special editing, such as after-treatment, usually employs flash scenes to catch consumers' attention. Flash scenes, however, bring the captured video not only the quality related to the receptiveness of the audiences, but also the accuracy of content analysis such as shot detection. It is thus desirable to develop an algorithm that detects and removes these disturbing abrupt scenes for human eyes.

Flash scenes also cause lots of unwanted shots that are supposed to belong to the same shots. Generally, accuracy of shot detection is essential and usually the primary step to do the video content analysis. Therefore, the development of this algorithm is urgent and important.

FIG. 1 shows a flow chart of an operation method for scene/shot change detector described in USPTO Pub. No. 2004/0008284A1. Wherein the detector includes frame buffer storing two image frame data, which are converted into color signals. Then the detector detects the scene/shot change by calculating the histograms from those color signals of video. The method thereof comprises:

Two image frame data are stored in the frame buffers individually for detecting scene/shot change (step S150); and the image frame data stored in buffers are converted into chroma or brightness color signal (step S152); a histogram detection unit calculates the histograms respect to converted chroma luminance color signal (step S154); then a dependence value (in USPTO Pub. No. 2004/0008284A1, this value is termed a correlation value) C is calculated with respect to the two histograms (step S156); and comparing the value C with a preset threshold, and determining whether the value C is smaller than the threshold (step S158); if the value C is smaller than the threshold, the scene/shot change signal Csc is outputted as 1 (Csc=1), or Csc equals to 0 (step S160, S162).

In conclusion, the art shown in FIG. 1 illustrated the method for detecting the scene/shot change which is calculated from the comparison between the signals converted from two stored image frames in histogram and a preset threshold.

Further reference is made to FIG. 2 showing the USPTO Pub. No. 2003/0123726A1, which is a block diagram illustrating an apparatus for detecting a scene/shot change. The apparatus comprises a first accumulated histogram extracting part 201, a first pixel list extracting part 202, a second accumulated histogram extracting part 203, a second pixel list extracting part 204, a histogram comparing part 205 and a scene change determining part 206. The accumulated histograms of a first frame $I_1$ and a second frame $I_2$ being adjacent to the first frame $I_1$ are extracted to the first accumulated histogram extracting part 201 and second accumulated histogram extracting part 203 respectively.

After that, the first pixel list extracting part 202 extracts a pixel list $C_1$ corresponding to an accumulated distribution value from the first accumulated histogram extracting part 201. Simultaneously the second pixel list extracting part 204 extracts a pixel list $C_2$ from the second accumulated histogram extracting part 203. Then, the histogram comparing part 205 compares the outputs $L_1$, $L_2$ of the first and second pixel list extracting parts 202, 204. Finally, the scene conversion determining part 206 analyzes the output of the frame difference E with a predefined threshold from the histogram comparing part 205, and determines whether the scene/shot change occurs thereby.

By repeating the steps for detecting the scene/shot change aforementioned, a memory is required for storing the differences, then, the averaging difference among the frames nearby is calculated to determine the scene/shot change.

The methods in the prior arts have been proposed to deal with detection of flash scenes. Most of them are incorporated to analyze an individual frame for finding out high intensity of pixel luminance value. However, the misdetection always occurs since the frame exists on large-scale white background. Nevertheless, it is still difficult to determine whether the image involves a flash scene only by a threshold value that reflects the percentage of high intensity region therein.

In view of the drawback of the prior art, efficient detection and elimination of flash scenes is one of the important issues for obtaining accurate shot information. Shot detection is usually the first step for any visual content analysis such as indexing, skimming and abstraction. The present invention discloses the video content analysis and processing for video management.

SUMMARY OF THE DISCLOSURE

The present invention provides a method for detecting and eliminating flash scenes in video signals based on shot distribution knowledge. The luminance difference between two consecutive frames is used to analyze the visual content. The effects of flash scenes can be categorized into three major types, which includes the method for detecting and eliminating flash scene with the following steps: a video sequence is inputted; then a sequential frames of the video sequence is extracted; each luminance difference for every two adjoining frames is calculated, and a histogram recording the luminance differences among the frames is made thereby; next, a threshold according to the histogram is determined; finally, the flash scene is categorized into three types, and used to eliminated the flash scene.

Wherein, Type 1 is determined as two consecutive luminance differences being larger than the threshold, and the method further comprising the steps: (a) comparing each luminance difference with the threshold predefined; (b) calculating a peak difference between two luminance differences; (c) if the peak difference between two luminance differences is larger than the threshold comparing the peak difference with a predefined percentage; and (d) if the peak difference is smaller than the predefined percentage, determining the Type 1.

Wherein, Type 2 is determined since the flash scenes last for more than one frame, wherein two or more consecutive flash frames will cause two peaks that have a certain interval therebetween, further comprising the steps: (a) comparing each luminance difference with the threshold predefined; (b) calculating the number of frames between two peaks apart with the luminance differences; (c) calculating a peak difference between the two neighboring luminance differences; (d) if the peak difference between two neighboring luminance difference is larger than the threshold, comparing the peak difference with a predefined percentage; and (e) if the peak difference is smaller than the predefined percentage, determining the Type 2.

Wherein, Type 3 is determined since a special editing technique will produce many shot changes and the intervals smaller than the predefined threshold therebetween, further comprising the steps: (a) comparing each luminance difference with the threshold predefined, and determining a shot change; (b) searching the next shot change; (c) counting the number of frames between the two shot changes; (d) comparing the number with a given number; and (e) determining the Type 3 having the special editing effects.

BRIEF DESCRIPTION OF DRAWINGS

The present invention will be readily understood by the following detailed description in conjunction accompanying drawings, in which.

DETAILED DESCRIPTION OF THE PREFERRED EMBODIMENTS

To allow the Examiner to understand the technology, means and functions adopted in the present invention, reference is made to the following detailed description and attached drawings. The Examiner shall readily understand the invention deeply and concretely from the purpose, characteristics and specification of the present invention. Nevertheless, the present invention is not limited to the attached drawings and embodiments in following description.

Method disclosed is proposed to detect and eliminate flash scene in digital video, and particularly, the averaging shot distribution of video is employed as the knowledge to develop the algorithm of the present invention. Thereby, the averaging shot distribution knowledge causes the identification of three general types of shot distribution shown as the flash scene effects.

Nevertheless, the proposed method is based on the difference between two consecutive frames instead of actually analyzing the visual content. The computational complexity is significantly reduced. As a result, positions of flash frames can be exactly detected from video signal for many applications.

Shot, a cinematic term, is the smallest addressable video unit (or the building block). A shot contains a set of continuously recorded frames, and the shot length is defined as the distance between two shot changes. Existing work on the shot detection has been published extensively and could be categorized into the following classes: pixel-based, histogram-based, feature-based, statistic-based and transform-based methods. However, the sum of the absolute luminance difference between two consecutive frames is widely used to detect the shot change because of the simplicity and acceptable results. If the value of luminance difference is larger than a predefined threshold, a shot change occurs.

Figure 1:
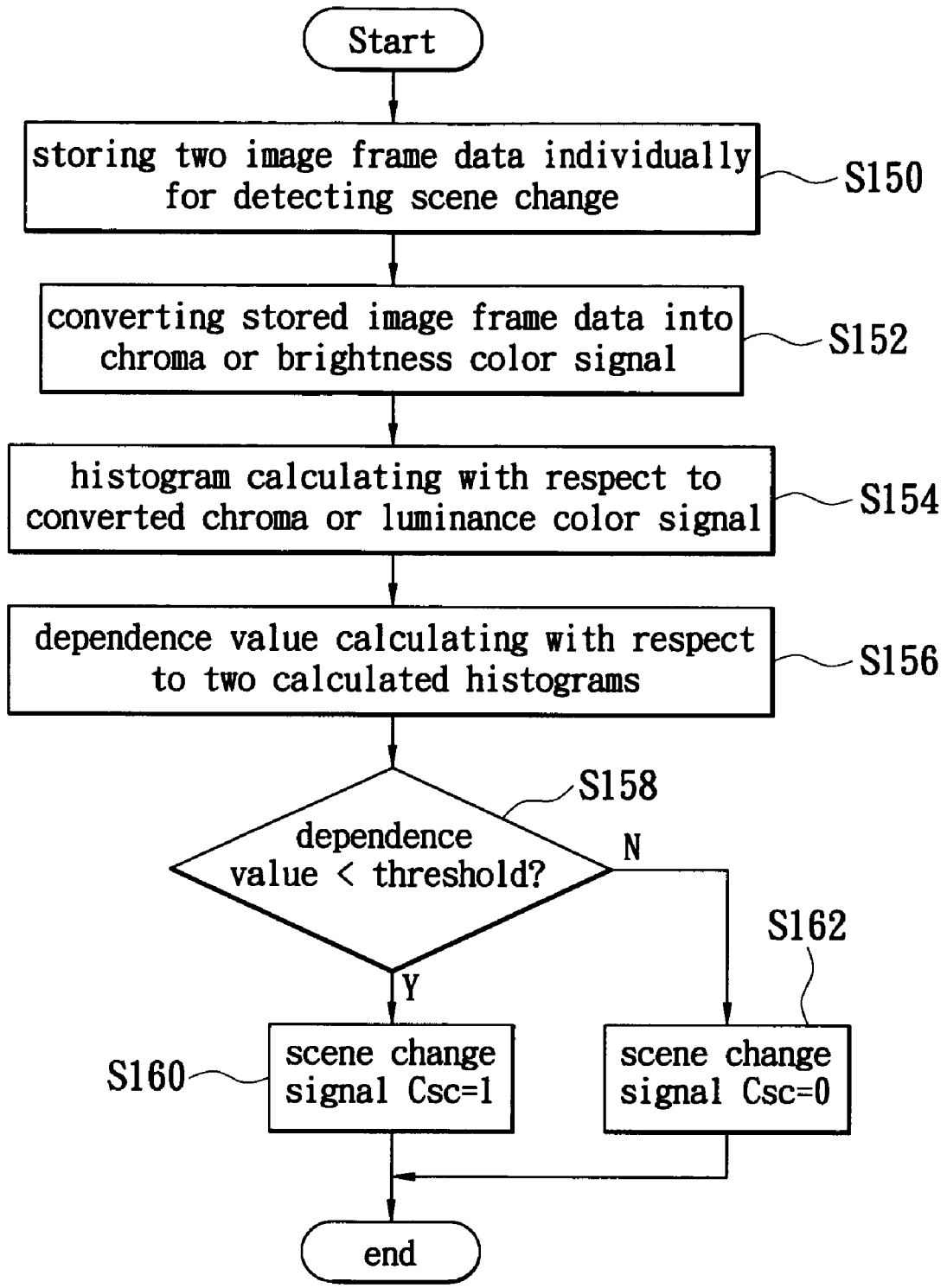
FIG. 1 is a flow chart showing an operation method of the scene/shot change detector of the related art.
Figure 2:
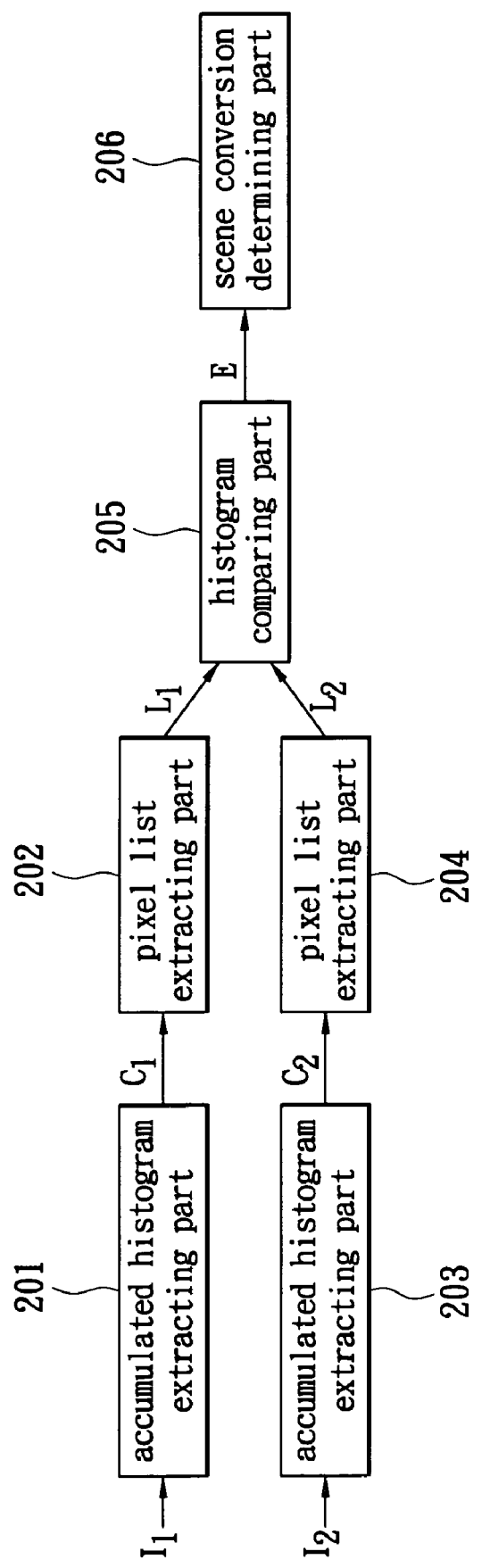
FIG. 2 is a block diagram illustrating an apparatus for detecting a scene/shot change of the related art.
Figure 3A:
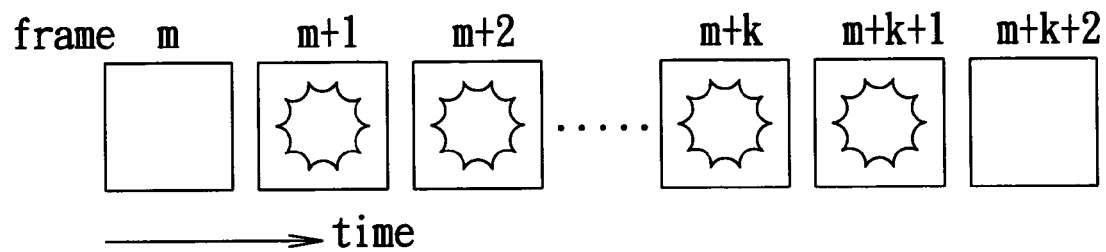
FIGS. 3A and 3B show the relationship of the indexes of the original frames and their corresponding luminance difference values.
Figure 3B:
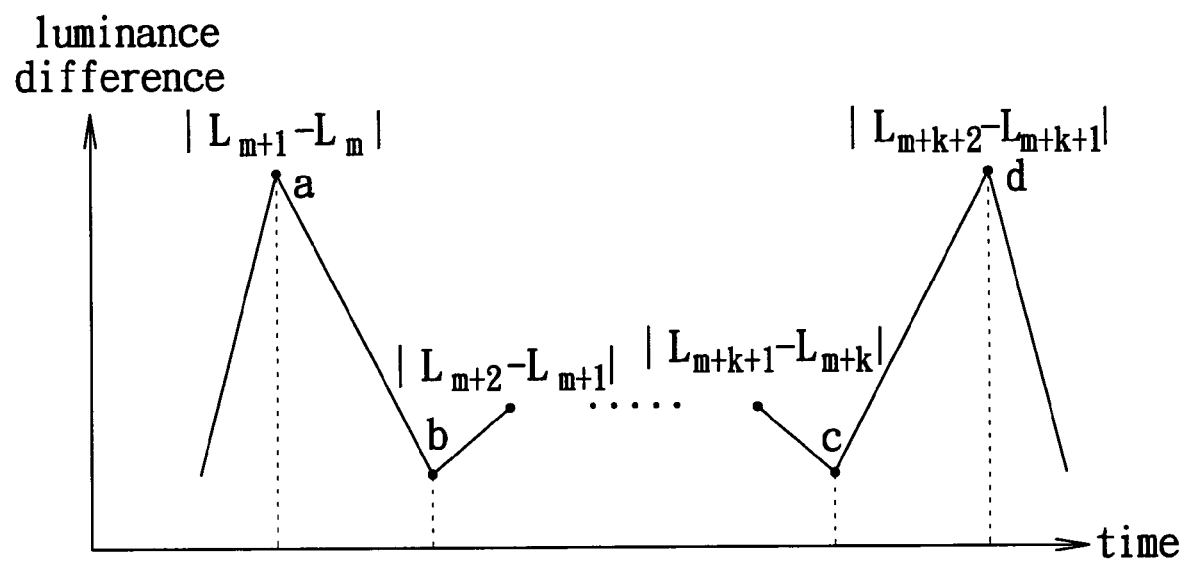

Reference are made to FIGS. 3A and 3B showing the relationship of the indexes of the original frames and their corresponding luminance difference values. The indexes m, m+1, m+2, m+k, m+k+1, m+k+2 etc., which present the contiguous frames shown in FIG. 3A, propagates as time goes. When flash scene appears in a period of time, for example, the flash sign shown in frames m+1, m+2 to m+k+1 are presented as flash scene. Thereby, the effects of a flash scene can be seen in the luminance difference shown in the histogram of FIG. 3B. Where a first difference value $|L_{m+1}-L_m|$ is the luminance difference of frame m and frame m+1, presented as "a", and a second difference value $|L_{m+2}-L_{m+1}|$ is the luminance difference of frame m+1 and frame m+2, presented as "b", and a third difference value $|L_{m+k+1}-L_{m+k}|$ is the luminance difference of frame m+k and frame m+k+1, presented as "c", and a fourth difference value $|L_{m+k+2}-L_{m+k+1}|$ is the luminance difference of frame m+k+1 and frame m+k+2, presented as "d".

From the statement mentioned above, it obviously shows the peak "a" indicating the moment flash starts, and the peak "d" indicating the moment flash ends since they present two sharp peaks in the luminance difference histogram. The time interval between vale "b" and "c" indicate the period the flash proceeds since the peaks have gentle slope.

Figure 4:
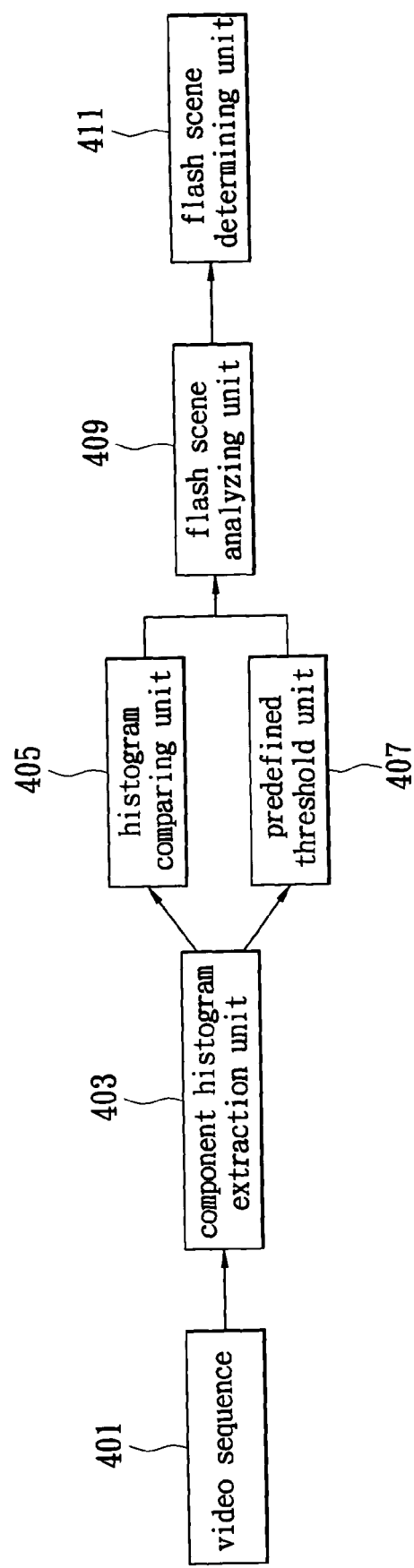
FIG. 4 shows a block diagram of flash scene detection according to the present invention.

FIG. 4 shows a block diagram of flash scene detection according to the present invention. In the beginning, a sequence of video, namely a video sequence 401, is inputted. Then a component histogram extraction unit 403 retrieves the video sequence 401, from which the sequential frames are extracted, and makes a counting histogram in accordance with each frame's luminance. Next, the histogram goes to a histogram comparing unit 405, where the sequential frames are compared with each other nearby, and the luminance differences are calculated and shown in the histogram. Meanwhile, the histogram resulted from the component histogram extraction unit 403 goes to a predefined threshold unit 407, where a reasonable threshold will be de determined.

After that, the luminance differences presented in the histogram and the threshold corresponsively are transmitted to a flash scene analyzing unit 409, therein the luminance differences and the threshold are compared, and further the peak difference is calculated between the neighboring peaks shown in histogram. Then a Type 1 and Type 2 flash scene are determined in a flash scene determining unit 411 by the comparison and the peak difference mentioned above. In the meanwhile, a Type 3 flash scene from special editing is determined in the flash scene determining unit 411 as well by comparing the luminance difference between the frames and the threshold defined by the predefined threshold unit 407, and by further determination of the number of frames between two shot changes resulted of the flash scene analyzing unit 409.

Figure 5:
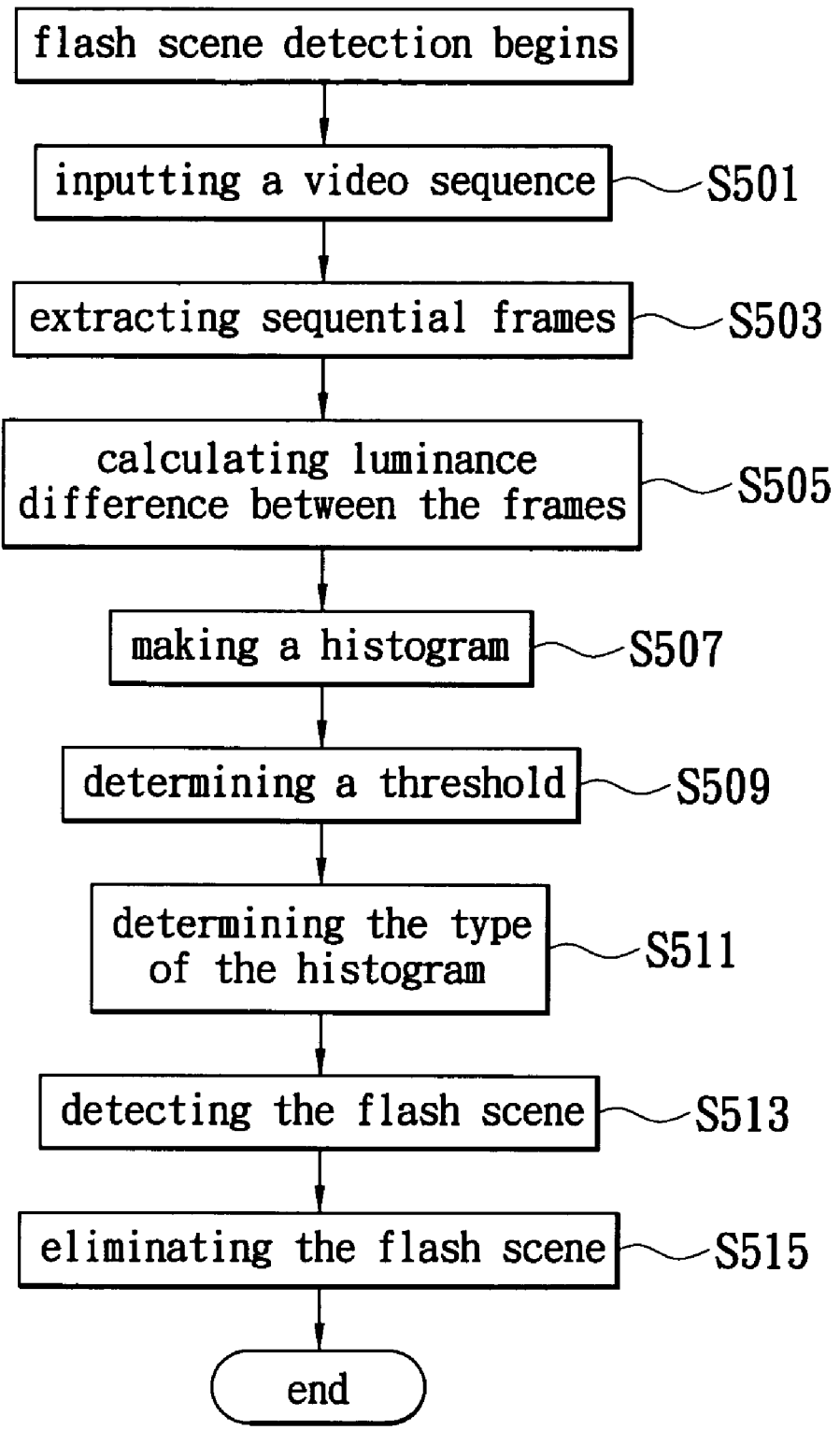
FIG. 5 is a flowchart of the method of the present invention.

FIG. 5 shows a flowchart of the method of the present invention. When the flash scene detection process begins, a video sequence is inputted (step S501). Then the video sequence goes to the component histogram extraction unit, and sequential frames thereof are extracted from the video (step S503). In the step S505, the luminance differences between the frames are calculated, for example, the luminance difference between frame m+1 and frame m is calculated as $|L_{m+1}-L_m|$, where $L_m$ denotes the luminance of frame m, $L_{m+1}$ denotes the luminance of frame m+1.

Then, a histogram, which records the data from the calculated luminance differences, is made (step S507). Based on the histogram made in step S507, a threshold is determined for detecting a shot change (step S509). According to the histogram and the threshold determined thereof, the effects of a flash scene are categorized into three types (step S511). Thus, a shot change will be considered as a flash scene when it is detected (step S513) and eliminated afterward (step S515). As the preferred embodiment of the present invention, the frames within the detected flash scene can be ignored, re-calculated, or replaced by the average value around the flash scene.

Accordingly, following disclosure illustrates the three major types.

Figure 6A:
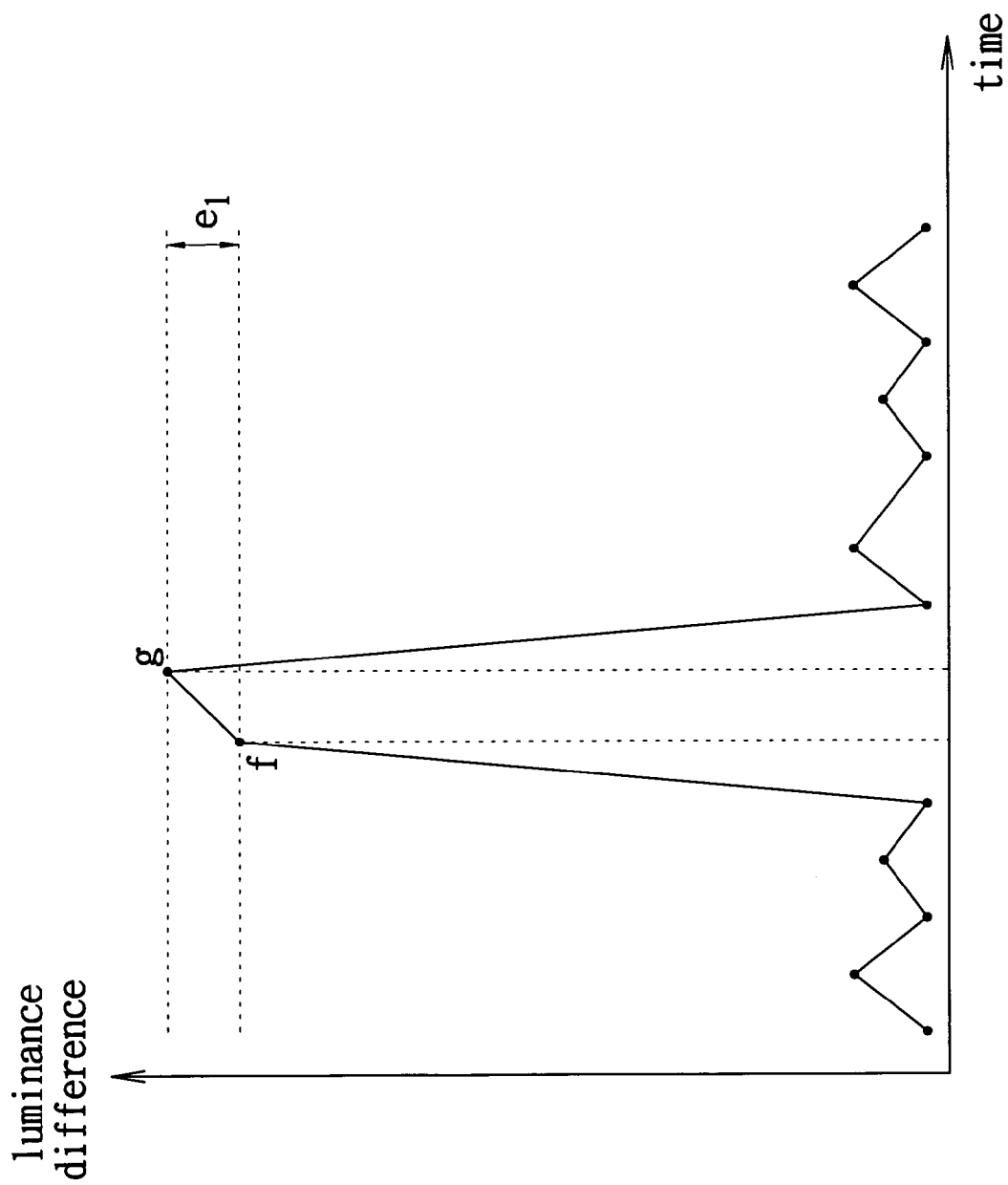
FIG. 6A is a histogram of the luminance differences of video frames in Type 1.

Type 1:

One flash event occurred in one frame will cause two similar peak values, which denoted as "f" and "g", of the luminance difference shown in FIG. 6A. The peaks "f" and "g" in the histogram are identified as shot changes classified as Type 1 since two consecutive luminance differences are larger than a certain threshold T. Based on the shot distribution knowledge, the length of two neighboring shots at least exists includes 10 frames, therefore, the present invention claims that this is the effect of a flash scene and the position of the corresponding flash frame can be easily detected. In the present embodiment, the length between two neighboring shots is set to be at least 10 frames. However, the minimum length between two neighboring-shots as suggested herein is intended to be taken as an example for the purpose of illustration only, but is not intended to be limitative or exhaustive to the precise form disclosed. The difference "e1" of two peak values should be fallen in a predefined percentage P, for example, 10%. P can be defined as the equation (1).

$$P = \frac{|H_{n+1} - H_n|}{\max(H_n, H_{n+1})} \times 100\% \quad (1)$$

Where $H_n$ shows the luminance difference between two consecutive frames n and n+1, and $H_{n+1}$ is for the frames n+1 and n+2 on the same account, and max( ) is to find the maximum value of $H_n$ and $H_{n+1}$. P shows the of difference percentage between two consecutive difference peaks thereof. For example, the luminance difference $H_{n+1}=|L_{n+2}-L_{n+1}|$, $H_n=|L_{n+1}-L_n|$ and the like. The preferred flowchart of the method in the present invention for Type 1 is shown in FIG. 6B.

Figure 6B:
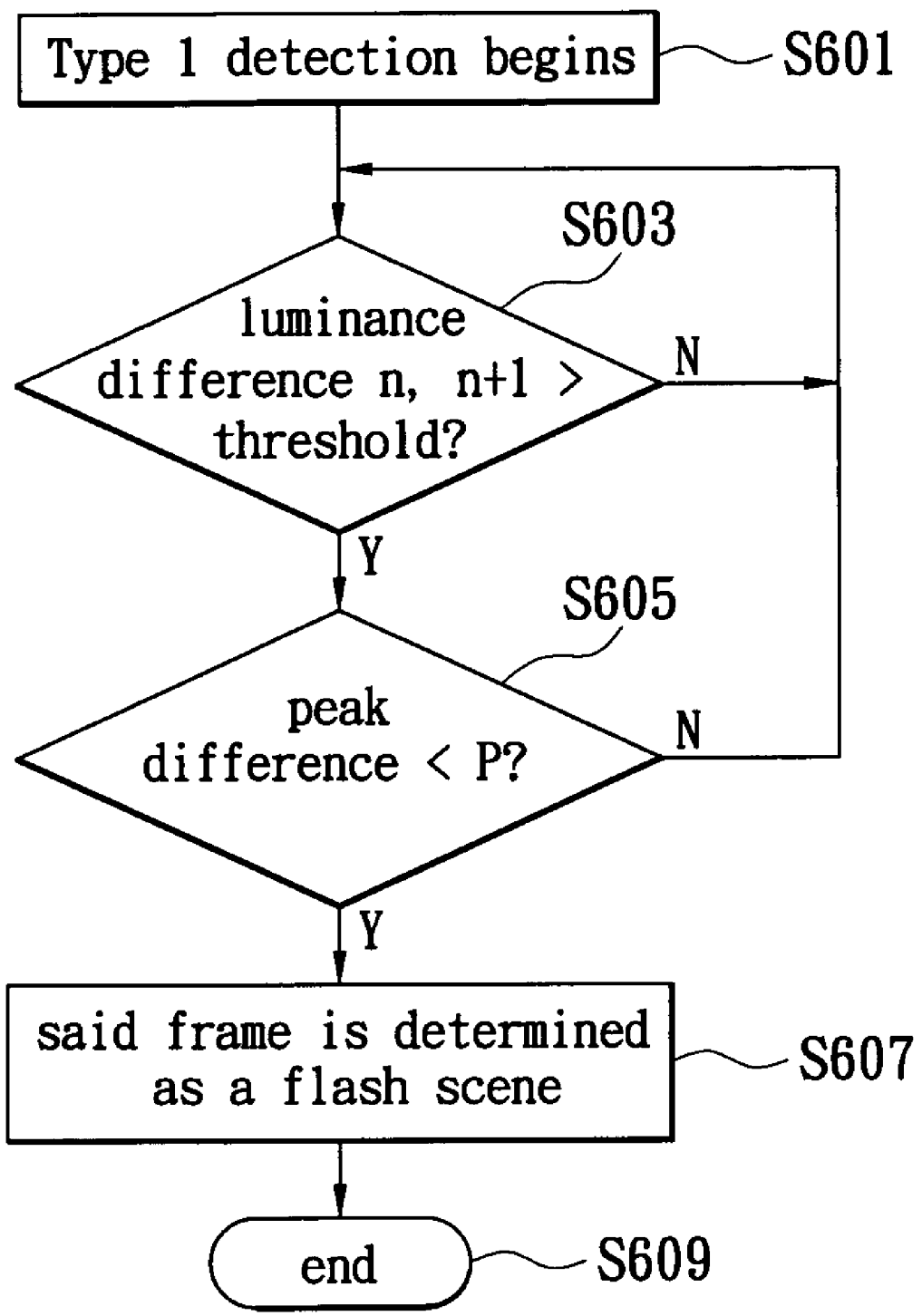
FIG. 6B is a flowchart of the method for detecting flash scene of Type 1.

FIG. 6B shows the preferred embodiment of a flash scene detection of Type 1. Before the steps for Type 1 detection of the present invention, the types of flash scene should be given. First, a video sequence is inputted to the component histogram extraction unit, and the frames within are extracted. Then the luminance differences between the luminance of the frames are calculated, and a histogram is made thereby. After that, a threshold is determined based on the histogram.

Then, Type 1 detection begins (step S601). Each luminance difference calculated from the two adjoining frames forms a peak in the histogram. Here, the values of any two neighboring peaks ($H_n$, $H_{n+1}$ are example) are compared with the predefined threshold (step S603). If the values of the two consecutive peaks are smaller than the threshold, the next two neighboring peaks are being compared. If the values of the two consecutive peaks are larger than the threshold, a peak difference between the two consecutive peaks is calculated. The peak difference is determined whether it is fallen in a predefined percentage P, the result from equation (1) (step S605). If the peak difference is larger than the predefined percentage, the method continues to find and compare the next two neighboring peaks with the threshold. If the peak difference is smaller than the predefined percentage, the corresponding frames are determined as a flash scene (step S607). Then, the steps for detecting the flash scene of Type 1 are ended (step S609).

Figure 7A:
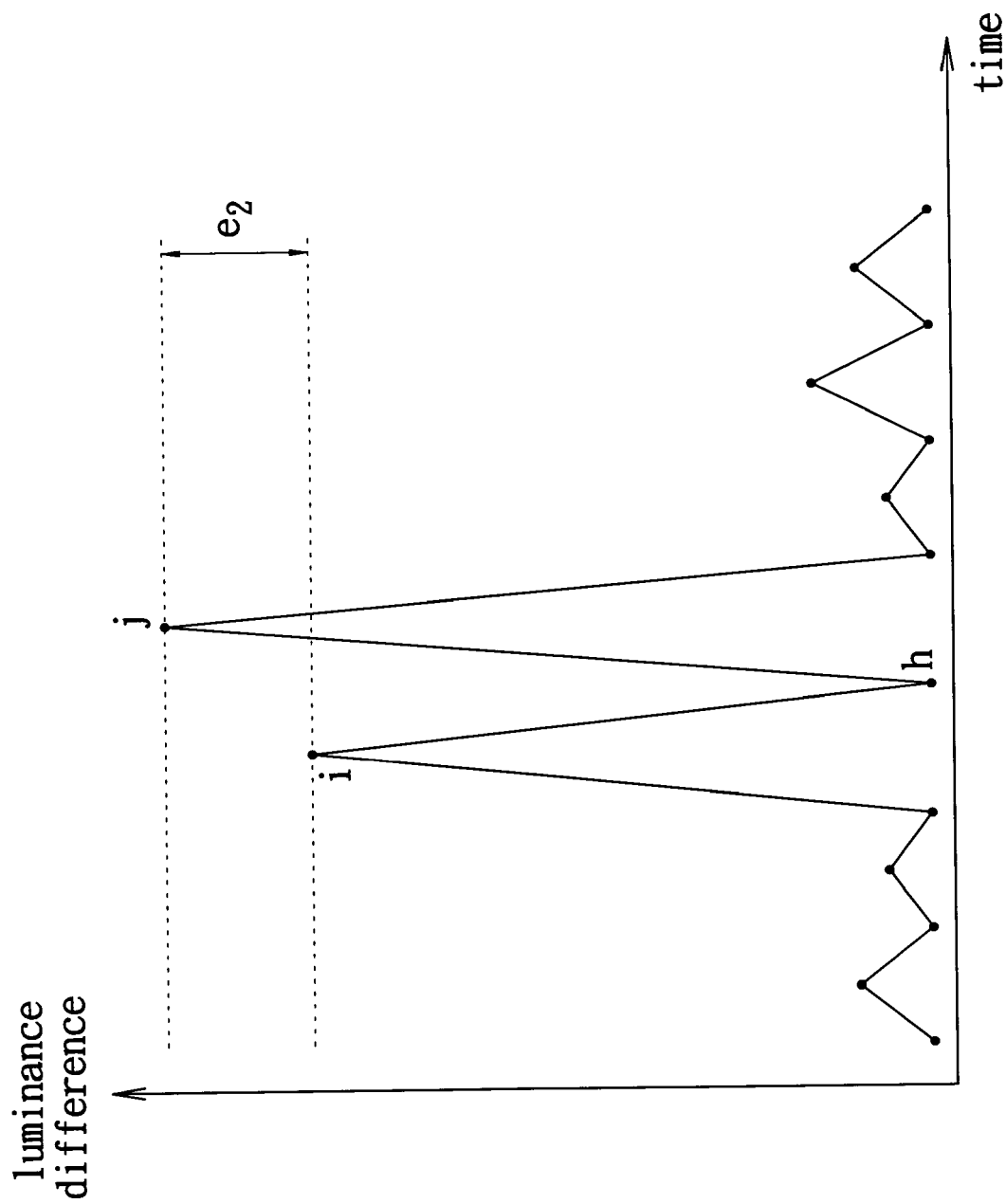
FIG. 7A is a histogram of the luminance differences of video frames in Type 2.
Figure 7B:
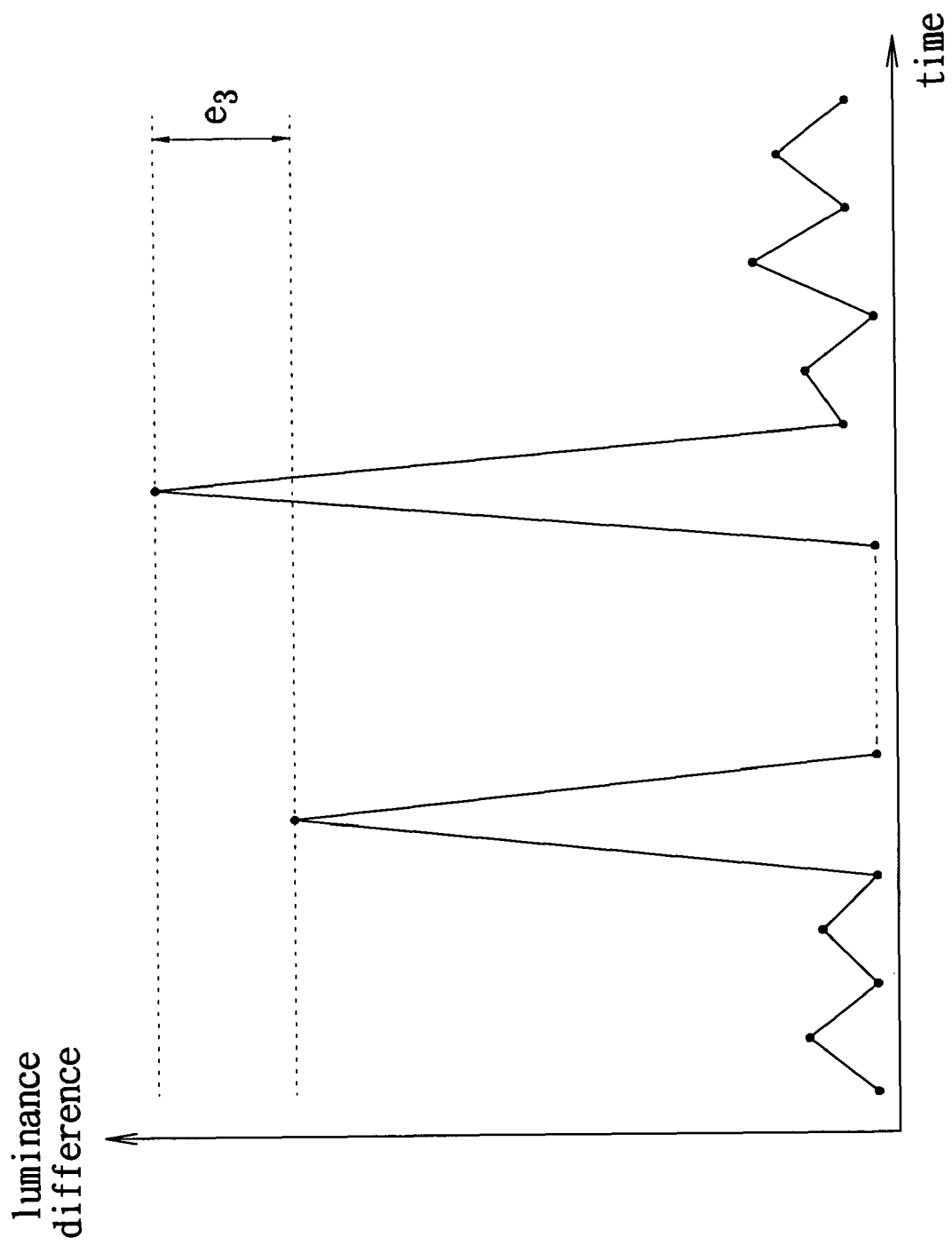
FIG. 7B is a histogram of the luminance differences of general case of Type 2.

Type 2:

The histogram for Type 2 is referring to FIG. 7A and FIG. 7B showing the luminance differences of video frames thereof. When flash event occurs, flash scenes may last for more than one frame depending on a variety of factors such as the lasting time of the flashlight and the distance between the main scene and camcorder. Two or more consecutive flash frames will cause two similar peak values that have a certain interval shown in FIGS. 7A and 7B. In accordance with the preferred embodiment, the length between two neighboring shots is set to be at least 10 frames. However, the minimum length between two neighboring shots as suggested herein is intended to be taken as an example for the purpose of illustration only, but is not intended to be limitative or exhaustive to the precise form disclosed.

Figure 7C:
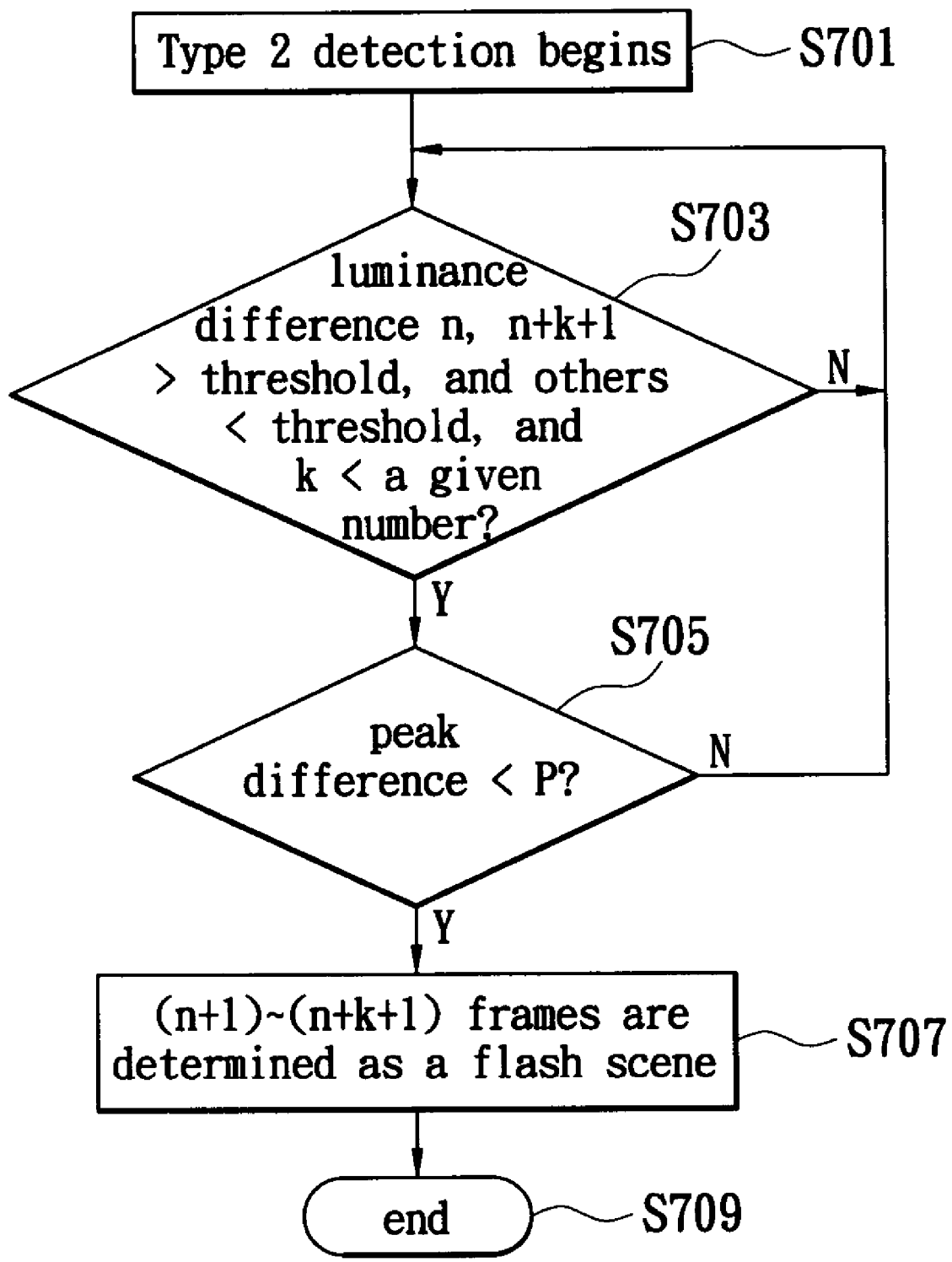
FIG. 7C is a flowchart of the method for detecting flash scene of Type 2.

FIG. 7A shows that the time of the flash scene occupies two-frame duration and it causes one vale value "h" between two peak values "i" and "j". FIG. 7B shows that the flash scene lasts for more than two frames in general case of Type 2, but the number of frames is usually less than a certain number (presented as number k, k<10 is one of the preferred embodiments). Similarly, equation (1) is used to calculate the peak differences "e2" and "e3" between two peak values shown in FIGS. 7A and 7B respectively. From the shot distribution knowledge, the present invention claims that these two cases are the effects of flash scenes but not really shot changes. The flowchart of the preferred embodiment for Type 2 of the present invention is shown in FIG. 7C.

Before the detecting steps for Type 2, the types of flash scene should be given. Similar with the process for Type 1, a video sequence is inputted to the component histogram extraction unit is the first step, and the frames within are extracted. Then the luminance differences between the luminance of the frames are calculated, and a histogram is made thereby. After that, a threshold is determined based on the histogram.

Type 2 detection begins after the threshold is determined (step S701). Every luminance difference is compared with the threshold for Type 2. As the flash event lasts for k frames, namely luminance differences $H_n$ and $H_{n+k+1}$, which are a certain number (k) of frames apart, are determined to be larger than the threshold, and other luminance differences are smaller than the threshold, where k is smaller than a given number (k<10 is the preferred embodiment) in the mean time (step S703). If the luminance difference $H_n$ and $H_{n+k+1}$ are not larger than the threshold, or others are not smaller than the threshold, or k is larger than the certain number, the next proper process for flash scene detection should be processed.

Next, the peak difference between the luminance differences $H_n$ and $H_{n+k+1}$ is determined whether it is fallen in a predefined percentage P, which is calculated from equation (1) (step S705). If the difference is larger the predefined percentage P, the steps will go to step S703 to find next probable flash scene.

If the peak difference is smaller than the predefined percentage P, the frames n+1 to n+k+1 are determined as a flash scene (step S707). Then the method for Type 2 detection ends (step S709).

Type 3:

Special editing techniques are widely used in commercials to attract consumers' attention. However, special editing techniques will produce unwanted shot changes and decrease the accuracy of shot detection. Here, the embodiment of the present invention illustrates the identification of special editing based on the shot distribution knowledge. The condition does not match the shot distribution knowledge and does not belong to Types 1 and Type 2 will be identified as special editing techniques.

Figure 8A:
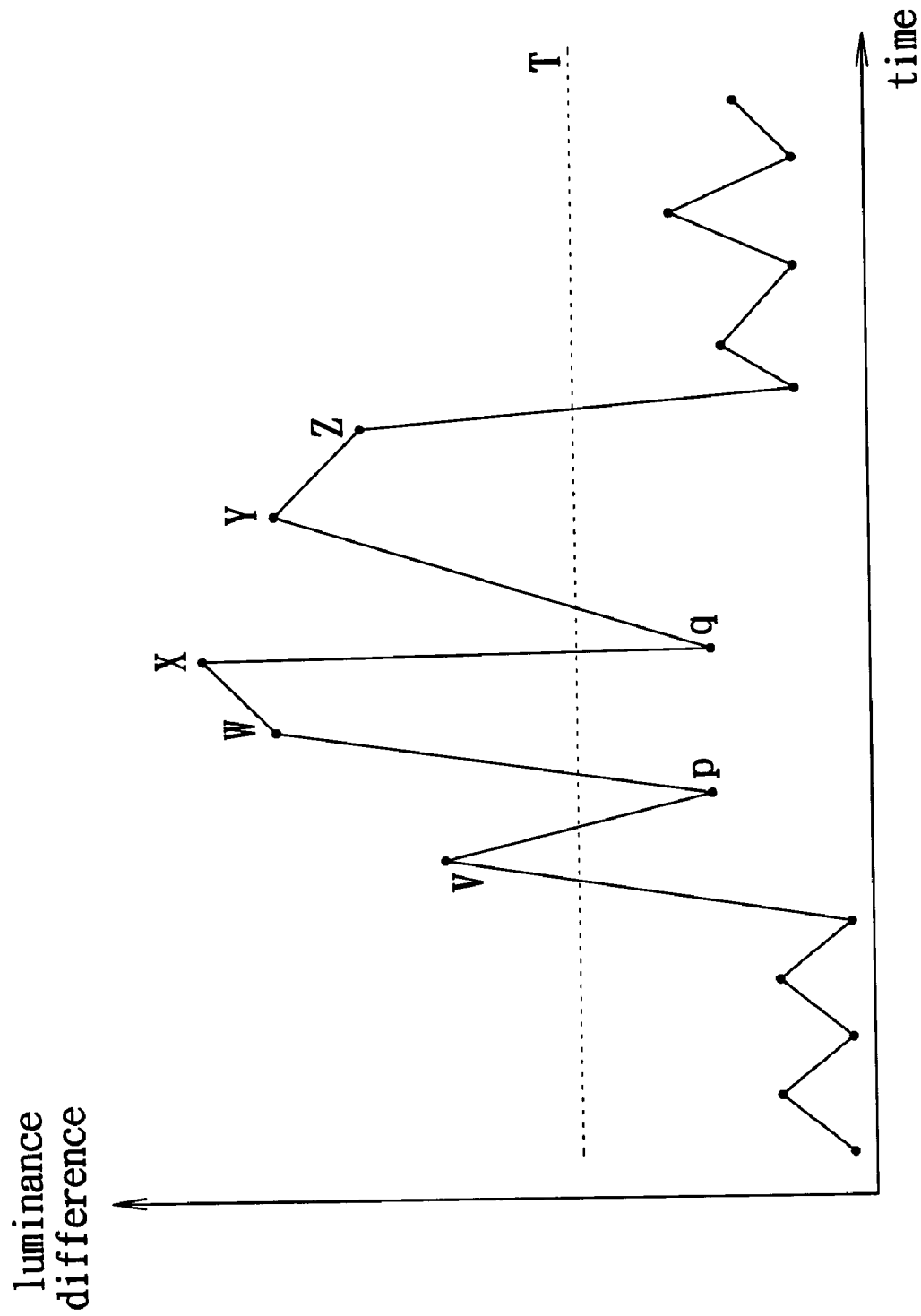
FIG. 8A is a histogram of the luminance differences of video frames in Type 3.

FIG. 8A shows a histogram of the luminance differences of video frames belonging to Type 3. Wherein, the effect of one of the special editing techniques on the luminance difference called continuous flash scenes. The special editing technique determined as Type 3 will produce many shot changes and the frames involved in the interval therebetween are smaller than a predefined threshold, which is based on shot distribution knowledge. The luminance difference peaks "V", "W", "X", "Y" and "Z" show many shot changes occurred in a period of time, and also some values "p" and "q" appear among them. The present invention claims that there should be continuous flash scenes for special editing in video.

Figure 8B:
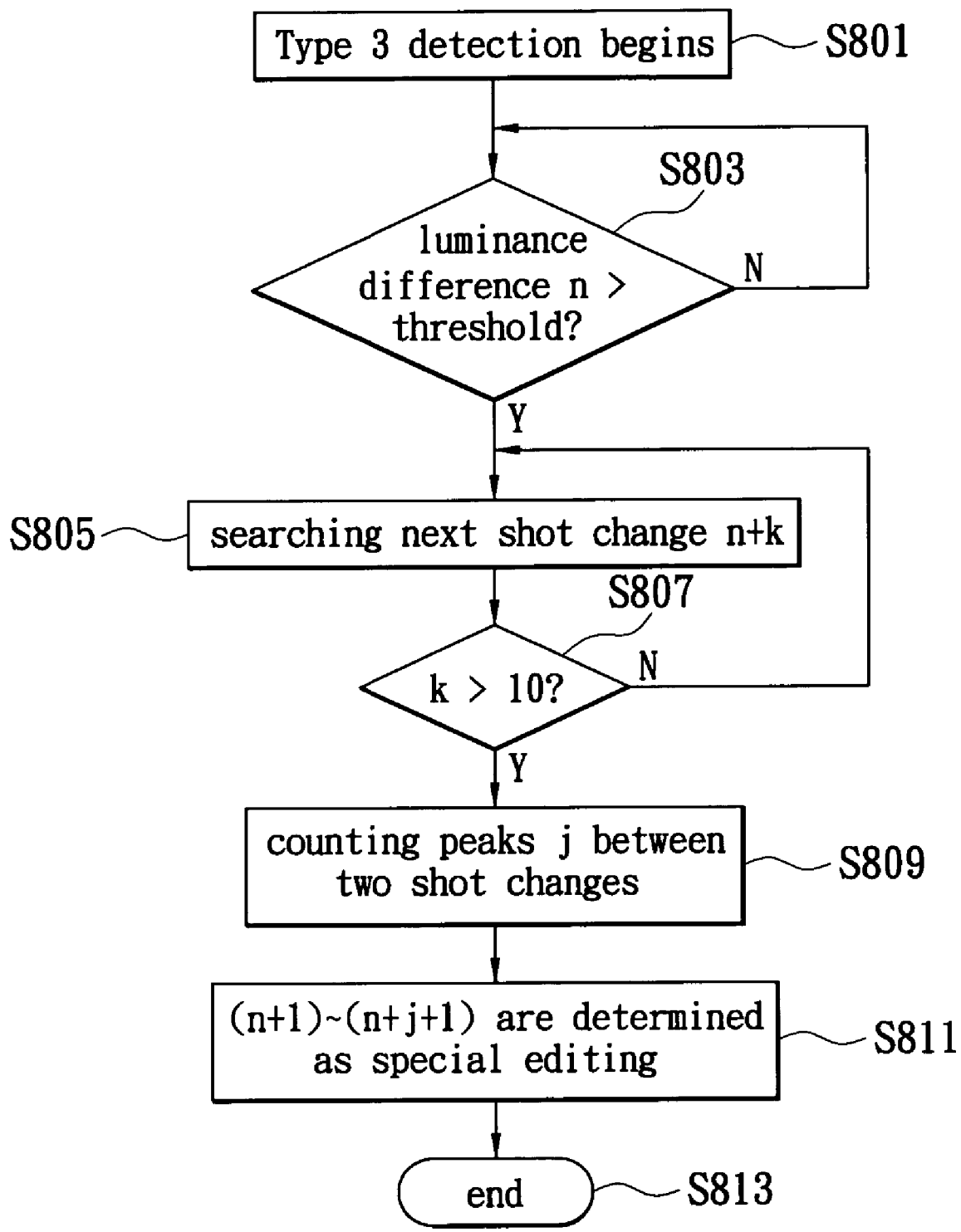
FIG. 8B is a flowchart of the method for detecting flash scene of Type 3.

Then, FIG. 8B shows a flowchart of the method for detecting flash scene of Type 3.

Before the detecting steps for Type 3, a video sequence is inputted to the component histogram extraction unit in the first step, and the frames within are extracted. Then the luminance differences between the luminance of the frames are calculated, and a histogram is made thereby. After that, a threshold is determined based on the histogram.

Type 3 detection begins after the threshold is determined (step S801). Every luminance difference for the adjoining frames is compared with the threshold for Type 3, and used to determine whether the difference value is larger than the threshold (step S803). If the luminance difference of the frames is not larger than the threshold, there is no shot change occurred in the frame, then the process goes to find next shot change. On the contrary, there is a shot change occurred in the frame n since its related luminance difference is larger than the threshold, and goes to step S805 to search next shot change. The number of frames between two shot changes is denoted as k for following steps, then the next change is found in the frame n+k.

Next, in accordance with the preferred embodiment of the present invention, the number k is determined whether it's larger than 10 or other given number (step S807). If k is smaller than the given number (for example, 10), namely that could have another shot changes occurred in the later frames for Type 3 flash scene in a certain period of time. Otherwise, it fits up with the condition of Type 3 flash scene of the present invention if k is larger than the given number. Then the number of frames between the two shot changes is counted as number j (step S809). Finally, the present invention claims frame n+1 to frame n+j+1 are determined as special editing (step S811). Afterward, the method for detecting flash scene of Type 3 ends (step S813).

The present invention provides an advanced method for detecting flash scenes in video signal based on shot distribution knowledge. The luminance difference between two consecutive frames is used to be instead of actually analyzing the visual content. The effects of flash scenes can be categorized into three major types and easily be detected via the shot distribution knowledge of the invention. Whereby, the disturbing light scenes for human eyes can be removed and the accuracy of shot detection can be enhanced.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for detecting and eliminating a flash scene in digital video, the method comprising:
    inputting a video sequence;
    extracting a sequence of frames of the video sequence;
    calculating each luminance difference for every two adjoining frames;
    making a histogram recording the luminance differences among the frames;
    determining a threshold according to the histogram, which is used to detect the flash scene in the video sequence;
    categorizing the flash scene; and
    eliminating the flash scene by ignoring the flash scene, replacing the flash scene with an average value around the flash scene in the video sequence, or recalculating the flash scene,
    wherein in said categorizing the flash scene, a Type 1 is determined as two consecutive luminance differences larger than the threshold, the method further comprising:
    (a) comparing each luminance difference with the threshold predefined;
    (b) calculating a peak difference between two luminance differences;
    (c) comparing the peak difference with a predefined percentage; and
    (d) determining the Type 1.

2. The method as recited in claim 1, wherein each luminance difference calculated from the two adjoining frames forms a peak, and within the step (a), if the luminance difference is smaller than the threshold, then the next luminance difference is compared, and if the values of the two consecutive peaks are larger than the threshold, then the peak difference is calculated.

3. The method as recited in claim 1, wherein in the step (c), if the peak difference is larger than the predefined percentage, then the step (c) includes finding and comparing a next two neighboring peaks larger than the threshold, and if the peak difference is smaller than the predefined percentage, the corresponding frames are determined as the flash scene.

4. The method as recited in claim 1, wherein the predefined percentage, P, is given by:

$$P = \frac{|H_{n+1} - H_n|}{\max(H_n, H_{n+1})} \times 100\%,$$

where $H_n$ is the luminance difference between two consecutive frames n and n+1, and $H_{n+1}$ is for the frames n+1 and n+2 on the same account, max ($H_n$, $H_{n+1}$) is the maximum value of $H_n$ and $H_{n+1}$.

5. The method as recited in claim 1, wherein in the step of eliminating the flash scene, the flash scene is ignored in the video sequence.

6. The method as recited in claim 1, wherein in the step of eliminating the flash scene, the flash scene is replaced by the average value around the flash scene in the video sequence.

7. The method as recited in claim 1, wherein in the step of eliminating the flash scene, the flash scene is re-calculated.

8. The method as recited in claim 1, wherein the eliminating of the flash scene is performed by replacing the flash scene with an average value around the flash scene in the video sequence, or recalculating the flash scene.

9. The method as recited in claim 1, wherein the eliminating of the flash scene is performed after the categorizing of the flash scene.

10. A method for detecting and eliminating a flash scene in digital video, the method comprising:
    inputting a video sequence;
    extracting a sequence of frames of the video sequence;
    calculating each luminance difference for every two adjoining frames;
    making a histogram recording the luminance differences among the frames;
    determining a threshold according to the histogram, which is used to detect the flash scene in the video sequence;
    categorizing the flash scene; and
    eliminating the flash scene by ignoring the flash scene, replacing the flash scene with an average value around the flash scene in the video sequence, or recalculating the flash scene,
    wherein in the step of categorizing the flash scene, a Type 2 is determined if the flash scenes last for more than one frame, wherein two or more consecutive flash frames will cause two peaks that have a certain interval therebetween, the method further comprising:
    (a) comparing each luminance difference with the threshold predefined;
    (b) calculating a number of frames between two peaks apart with the luminance differences larger than the threshold as the flash event lasts for the number of frames, and comparing the number of frames with a given number;
    (c) calculating a peak difference between the two neighboring luminance differences larger than the threshold;
    (d) comparing the peak difference with a predefined percentage; and
    (e) determining the Type 2.

11. The method as recited in claim 10, wherein each luminance difference calculated from the two adjoining frames forms a peak, and within the step (a) and step (b), if the luminance difference is smaller than the threshold, then the next luminance difference is compared, and if the values of the two luminance differences with the number frames apart are larger than the threshold, then the peak difference is calculated.

12. The method as recited in claim 10, wherein in the step (d), if the peak difference is larger than the predefined percentage, then the step (d) includes finding and comparing a next two neighboring peaks larger than the threshold, and if the peak difference is smaller than the predefined percentage, then the corresponding frames between the two peaks are determined as the flash scene.

13. The method as recited in claim 10, wherein in the step (b), if the number of frames between two peaks is larger than the given number, then step (a) is performed to compare a next luminance difference with the threshold, and if the number of frames is smaller than the given number, then step (c) is performed to calculate the peak difference.

14. The method as recited in claim 10, wherein the predefined percentage, P, is given by:

$$P = \frac{|H_{n+1} - H_n|}{\max(H_n, H_{n+1})} \times 100\%,$$

where $H_n$ is the luminance difference between two consecutive frames n and n+1, and $H_{n+1}$ is for the frames n+1 and n+2 on the same account, max ($H_n$, $H_{n+1}$) is the maximum value of $H_n$ and $H_{n+1}$.

15. A method for detecting and eliminating a flash scene in digital video, the method comprising:
    inputting a video sequence;
    extracting a sequence of frames of the video sequence;
    calculating each luminance difference for every two adjoining frames;
    making a histogram recording the luminance differences among the frames;
    determining a threshold according to the histogram, which is used to detect the flash scene in the video sequence;
    categorizing the flash scene; and
    eliminating the flash scene by ignoring the flash scene, replacing the flash scene with an average value around the flash scene in the video sequence, or recalculating the flash scene,
    wherein in the step of categorizing the flash scene, a Type 3 is determined if a special editing technique will produce many shot changes and an interval therebetween is smaller than a predefined threshold, the method further comprising:
    (a) comparing each luminance difference with the threshold predefined, and determining a shot change;
    (b) searching the next shot change;
    (c) counting a number of frames between the two shot changes;
    (d) comparing the number with a given number; and
    (e) determining the Type 3 having the special editing effects.

16. The method as recited in claim 15, wherein each luminance difference calculated from the two adjoining frames forms a peak, and within the step (a), if the luminance difference is smaller than the threshold, then the next luminance difference is compared, and if the luminance difference is larger than the threshold, then a shot change is met.

17. The method as recited in claim 15, wherein in the step (d), if the number is larger than the given number, then the number of frames are determined as special editing between the two shot changes.

18. The method as recited in claim 15, wherein in the step (d), if the number is smaller than the given number, then the next shot change will be searched in the later frames.

19. A method for detecting and eliminating flash scene in digital video, the method comprising:
    inputting a video sequence;
    extracting a sequence of frames of the video sequence;
    calculating each luminance difference for every two adjoining frames;
    making a histogram recording the luminance differences among the frames;
    determining a threshold according to the histogram, which is used to detect a flash scene in the video sequence;

comparing each luminance difference with the threshold predefined;

calculating a peak difference between two luminance differences larger than the threshold;

comparing the peak difference with a predefined percentage;

determining a Type 1 since two consecutive luminance differences are larger than the threshold; and eliminating the flash scene.

20. A method for detecting and eliminating flash scene in digital video, the method comprising:

inputting a video sequence;

extracting a sequence of frames of the video sequence;

calculating each luminance difference for every two adjoining frames;

making a histogram recording the luminance differences among the frames;

determining a threshold according to the histogram, which is used to detect a flash scene in the video sequence;

comparing each luminance difference with the threshold predefined;

calculating a number of frames between two peaks apart with the luminance differences larger than the threshold as the flash event lasts for the number of frames;

calculating a peak difference between the two neighboring luminance differences larger than the threshold;

comparing the peak difference with a predefined percentage;

determining a Type 2 if the flash scenes last for more than one frame, wherein two or more consecutive flash frames will cause the two peaks having a certain interval therebetween; and eliminating the flash scene.

21. A method for detecting and eliminating flash scene in digital video, the method comprising:

inputting a video sequence;

extracting a sequence of frames of the video sequence;

calculating each luminance difference for every two adjoining frames;

making a histogram recording the luminance differences among the frames;

determining a threshold according to the histogram, which is used to detect a flash scene in the video sequence;

comparing each luminance difference with the threshold predefined, and determining a shot change;

searching the next shot change;

counting a number of frames between the two shot changes;

comparing the number with a given number;

determining a Type 3 if a special editing technique produces the shot changes and an interval therebetween is smaller than the predefined threshold; and eliminating the flash scene.

* * * * *